United States Patent [19]
Trussell, Jr.

[11] Patent Number: 5,790,241
[45] Date of Patent: Aug. 4, 1998

[54] LASER RANGEFINDER

[75] Inventor: Charlie W. Trussell, Jr., Woodbridge, Va.

[73] Assignee: The United States of America as represented by the Secretary of the Army, Washington, D.C.

[21] Appl. No.: 689,217

[22] Filed: Aug. 7, 1996

[51] Int. Cl.[6] .................................................. G01C 3/08
[52] U.S. Cl. ........................................ 356/4.01; 356/5.01
[58] Field of Search .................................. 356/4.01, 5.01, 356/5.05, 5.1, 6; 250/338.1, 214 B, 214 C, 370.01, 559.29

[56] References Cited

U.S. PATENT DOCUMENTS

| | | | |
|---|---|---|---|
| 5,258,619 | 11/1993 | Duvall, III | 250/338.1 |
| 5,336,900 | 8/1994 | Peters et al. | 250/559.29 |
| 5,612,779 | 3/1997 | Dunne | 356/5.01 |
| 5,638,163 | 6/1997 | Nourrcier, Jr. et al. | 356/5.01 |
| 5,691,808 | 11/1997 | Nourrcier, Jr. et al. | 356/4.01 |
| 5,703,678 | 12/1997 | Dunne | 356/5.05 |

*Primary Examiner*—William L. Oen
*Attorney, Agent, or Firm*—Milton W. Lee; John E. Holford; Alain L. Bashore

[57] ABSTRACT

A system and technique for a laser rangefinder which uses a low peak power laser, scanner, and beam scanning device with a linear detector where target range corresponds to individual detector elements to enhance signal-to-noise ratio and maximum target range.

8 Claims, 1 Drawing Sheet

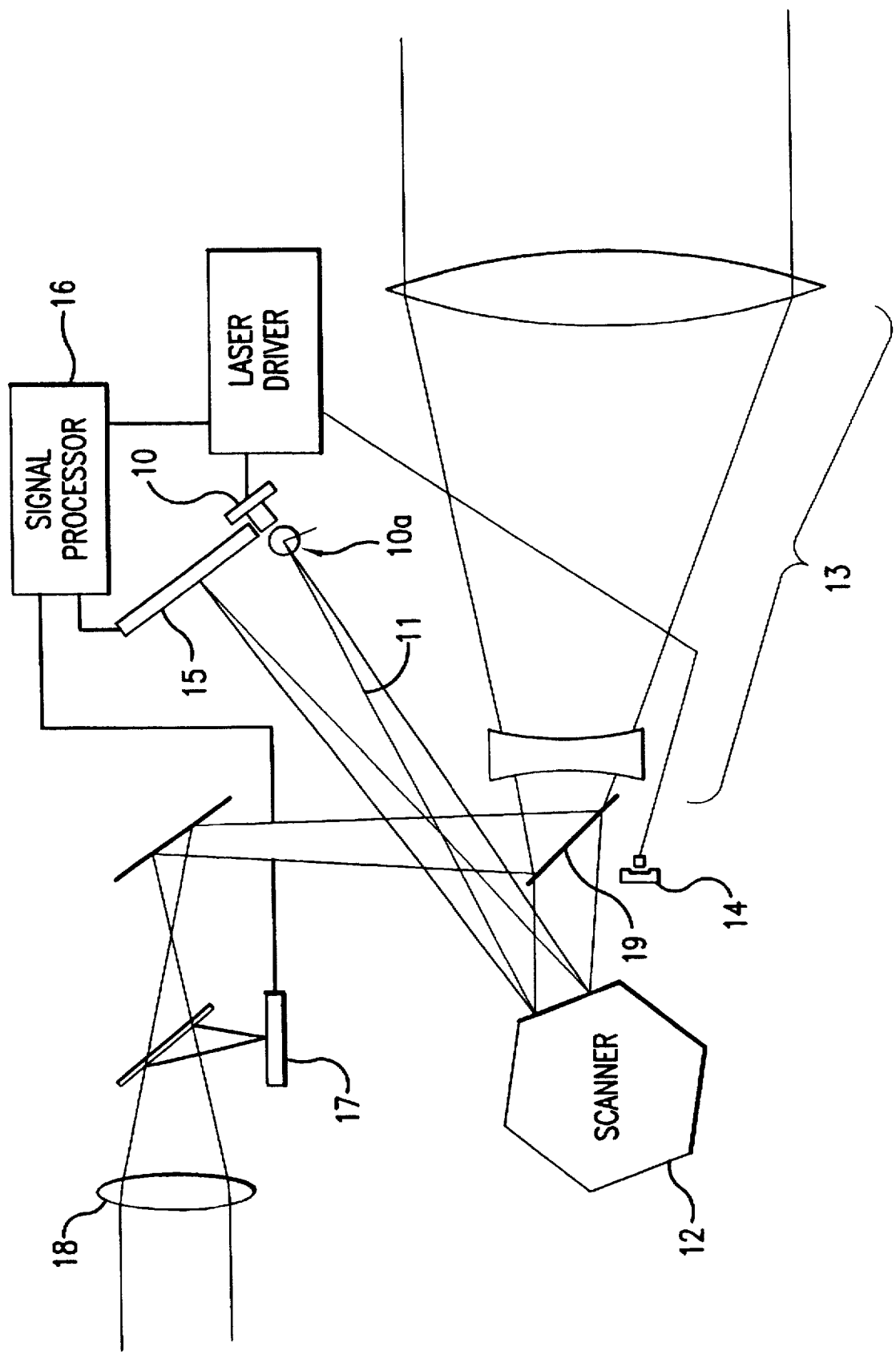

LASER RANGEFINDER

BACKGROUND OF THE INVENTION

1. Field of the Invention

The present invention generally relates to laser rangefinders and more specifically, to laser rangefinder systems and techniques for improved range performance of low peak power laser systems.

2. Description of Prior Art

Many laser rangefinders have been designed and produced for both commercial and military applications. Military laser rangefinders typically use a Nd:YAG pulsed laser with a peak power of about 1 million watts and can measure range to a target up to more than 5 kilometers. More recent versions use Er:glass lasers which have similar performance but operate at an eyesafe wavelength of 1.5 microns. These systems meet military requirements in a 2 or 3 pound system, but are too expensive for many commercial applications. These systems transmit a single, high peak power pulse of about 1 million watts and the range is determined by measuring the time elapsed between the laser pulse and the reflected, received light from the target. The range is then displayed digitally in the viewfinder.

There is now a requirement for lightweight, low cost, eyesafe laser rangefinders which will range to at least 1000 meters. These requirements can be met with laser diodes which are low cost and more efficient. However, they are also much lower power (about 10 watts peak power), so that a technique is needed to improve range performance. While the prior art has reported using laser rangefinders none have established a basis for a specific system and technique that is dedicated to the task of resolving the particular problem at hand. What is needed in this instance is a laser rangefinder system and technique for improved range performance of low power systems.

SUMMARY OF THE INVENTION

It is therefore one object of the invention to provide a laser rangefinder system and technique for improved range performance of low power laser systems.

According to the invention, there is disclosed a laser rangefinder system and technique for improved range performance. A low peak power laser transmitter emits a laser beam pulse which reflects off a scanner and then out through the main system optics. The pulse must be synchronized with the scanner using a sync. detector. Energy reflected from a target within the maximum range of the system is collected and collimated by the main system optics after a delay time corresponding to the distance to the target. At this time the scanner has scanned according to the scanning rate so that the received pulse is focused on a photon detector depending on the delay time and range. The photon detector would be a linear array of detectors which have the ability to collect and average the signal from many received laser pulses. If a number of laser pulses are transmitted while the scanner scans, the received pulses from a target at a fixed range will always fall on the same detector element, thus improving the signal to noise ratio. After all pulses are transmitted and received, the accumulated signals are read out of the detector array and compared in digital signal processor to determine the largest signal or either the first or last signal to cross a predetermined threshold. The selected detector element will then correspond to the range to the target and this information can be thus displayed.

The range is determined by time delay from the laser pulses to the return light which is translated to a position on the CCD detector array by scanning the return beam. For a repetitively pulsed laser, many return pulses will be added together at the same detector element to increase the signal-to-noise and improve the maximum range performance.

BRIEF DESCRIPTION OF THE DRAWINGS

The foregoing and other objects, aspects and advantages will be better understood from the following detailed description of a preferred embodiment of the invention with reference to the drawings, in which:

The sole drawing FIGURE is a plan view of the invention superimposed over a ray trace diagram.

DETAILED DESCRIPTION OF A PREFERRED EMBODIMENT OF THE INVENTION

Referring now to the drawing, there is shown a plain view of the laser rangefinder superimposed over a ray trace diagram. Low peak power laser transmitter 10, with lens 10a, emits beam 11 which reflects off scanner 12 and then out the main system optics 13. Main system optics 13 functions to collimate the laser output into a narrow beam and collect the returning light reflected by the target. In the preferred embodiment low peak power laser transmitter or driver 10 may be a laser diode, and scanner 12 may be a rotating multifaceted reflecting wheel, such as a polygon. It is understood that any low power laser transmitter and scanning means may be used in the invention. Other scanning means may include: a resonant vibrating mirror scanner, an electro-optic or acousto-optic method, and other low peak power lasers include: small, diode pumped solid state lasers which operate at a high repetition rate. Beam 11 reflects off scanner 12 and then out of main system optics 13. The laser pulse must be synchronized with scanner 12 using sync. detector 14. Energy reflected from a target within the maximum range of the system is collected and collimated by main system optics 13 after a delay time corresponding to the distance to the target. At this time the scanner has scanned according to the scanning rate so that the received beam is focused on photon detector 15 depending on the delay time and range. The photon detector would be a linear array of detectors which have the ability to collect and average the signal from many received laser pulses. In the preferred embodiment the detector is a CCD detector array.

If a number of laser pulses are transmitted while the scanner scans, the received pulses from a target at a fixed range will always fall on the same detector element, thus improving the signal to noise ratio. After all pulses are transmitted and received, the accumulated signals are read out of the detector array and compared in digital signal processor 16 to determine the largest signal or either the first or last signal to cross a predetermined threshold. Target range can also be determined, in an alternate embodiment, by using a linear display device where individual detector elements may be displayed on a corresponding elements of the display. The selected detector element will then correspond to the range to the target and this information can be displayed on the digital display 17 (or an analog display as already described) and on through to viewfinder 18. It is understood that any means may be used for the display which functions to show the range in numbers or graphically.

The system may also use a telescope (not shown) with crosshairs to aim the device at the desired target. This telescope could use the same system optics as the laser using optional diachronic beamsplitter 19 (or either a separate optical system could be used). The technique could be extended using a 2-dimensional detector array such as a CCD sensor commonly used in video cameras and a linear laser beam. Then the 2-D image would represent a one dimensional range profile of a target so that the range to many points along a line could be determined. The system and technique will provide a laser rangefinder which will make possible moderate range performance using a low power laser such as a laser diode or small solid state laser.

This technique will allow the use of a repetitively pulsed low power laser instead of a single high power laser pulse which will produce a lower cost, lighter weight package with good range performance. The averaging of 1000 or more laser pulses in photon detector improves the signal-to-noise ratio and therefore the detection range. The system is will also make possible the use of low power lasers in the eyesafe region of the spectrum, thus making the use of a moderate range rangefinder practical without concern for eye hazards. There is also a reduction of the daylight background noise further increasing the signal-to-noise ratio compared to previous designs.

While this invention has been described in terms of preferred embodiment consisting of the specific embodiment shown, those skilled in the art will recognize that the invention can be practiced with modification within the spirit and scope of the appended claims.

Having thus described my invention, what I claim as new and desire to secure by letters patent is as follows:

1. A laser rangefinder for improved range performance of a laser rangefinder utilizing a low peak power laser transmitter comprising:

a low peak power laser transmitter for emission of a train of laser beam pulses;

optical means for collimating the train of laser beam pulses for transmission to a target and receiving multiple returning target reflections as a received train of laser beam pulses with a corresponding delay time;

means for scanning, at a predetermined scanning rate, the received train of laser beam pulses for focus onto a discrete element of a photon detector corresponding to a target range as focused received laser beam pulses;

synchronization detector for synchronizing the received train of laser pluses with the scanner;

photon detector for collecting and averaging the focused received beam pulses of each pulse train as an averaging output, said photon detector further including multiple detector elements each corresponding to a selected target range;

display means for displaying a target range for the detector element corresponding to the target range, whereby signal-to-noise ratio and maximum target range is enhanced.

2. The laser rangefinder of claim 1 wherein there is further including a signal processor for comparing each pulse train to determining which detector element characterizes a largest signal to cross a predetermined threshold as a selected detector element.

3. The laser rangefinder of claim 1 wherein the low peak power transmitter is a laser diode.

4. The laser rangefinder of claim 1 wherein the means for scanning the received train of laser beam pulses for focus onto a photon detector as focused received laser beam pluses at a predetermined scanning rate dependent on the delay time and target range is a rotating polygon scanner.

5. The laser rangefinder of claim 1 wherein the means for scanning the received train of laser beam pulses for focus onto a photon detector as focused received laser beam pulses at a predetermined scanning rate dependent on the delay time and target range is a resonant vibrating mirror scanner.

6. The laser rangefinder of claim 1 wherein the photon detector is a CCD detector array.

7. A laser rangefinder technique for improving range performance of a laser rangefinder utilizing a low peak power laser transmitter comprising the steps of:

emitting a train of laser beam pulses from a low peak power laser transmitter;

collimating the train of laser beam pulses for transmission to a target;

receiving multiple returning target reflections as a received train of laser beam pulses with a corresponding delay time;

scanning the received train of laser beam pulses for focus onto a photon detector as focused received laser beam pulses at a predetermined scanning rate dependent on the delay time and target range;

synchronizing the received train of laser pulses with the scanner;

collecting and averaging the focused received beam pulses of each pulse train as an averaging output for each detector element, where each detector element corresponds to a selected target range;

displaying a target range for the selected detector element, whereby signal-to-noise ratio and maximum target range is enhanced.

8. The laser rangefinder technique of claim 7 wherein there is a further step of comparing each pulse train to determining which detector element characterized a largest signal to cross a predetermined threshold as the selected detector element.

* * * * *